May 17, 1966 C. H. MAPS, JR., ET AL 3,252,123

COMPUTER BUS ASSEMBLY

Filed June 11, 1963 2 Sheets-Sheet 1

INVENTORS
CHARLES H. MAPS, JR.
JAMES R. PATMORE

BY

E. A. Pe[illegible]

ATTORNEY

COMPUTER BUS ASSEMBLY

Filed June 11, 1963 2 Sheets-Sheet 2

INVENTORS
CHARLES H. MAPS, JR.
JAMES R. PATMORE
BY E. A. [signature]
ATTORNEY

United States Patent Office 3,252,123

Patented May 17, 1966

3,252,123

COMPUTER BUS ASSEMBLY

Charles H. Maps, Jr., Long Branch, and James R. Patmore, Neptune, N.J., assignors to Electronic Associates Inc., Long Branch, N.J., a corporation of New Jersey Filed June 11, 1963, Ser. No. 287,144
4 Claims. (Cl. 339—22)

This invention relates to low power, low voltage electrical distribution apparatus and more particularly to apparatus for interconnection of the various components and instrumentalities making up a multi-part electronic device such as a computer.

Increased use of multi-chassised electronic devices in computers has resulted in the development of two distinguishable types of assemblies; i.e., those assemblies employing "self-powered" components wherein each component has its own power supply and, secondly, those assemblies sharing a common power supply. While computers of both types are used, economy and computer accuracy make the use of a single power supply almost mandatory. A computer power supply must be capable of providing closely regulated and carefully filtered voltages of various potentials and polarities. Such power supplies are complex and are also expensive. To proliferate such power supplies as in the case of a large computer would greatly increase the computer cost.

One widely used computer includes a plurality of electrically interconnected separate "computing components" with each of the computing components mounted on an individual chassis. Examples of such "computing components" are amplifiers, function generators, integrators, dividing networks, and the like. These separate computing components are designed for ready interchange so that they may be grouped together in accordance with the calculations to be performed. For greatest convenience and compactness the components are constructed on a modular basis. A computer of this type is shown and described in a copending U.S. patent application entitled Computer Bus Assembly, filed November 6, 1962, S.N. 235,891, which is assigned to the same assignee as the present invention. The computing components in the above identified application are designed for plug-in connection to patching modules pre-mounted in the computer rack. Each type of plug-in unit has a patching module of a complementary connection configuration associated therewith. The patching modules are adapted to be electrically connected to a common power supply and to be inter-connected by patch cords. Each patching module is itself modular in form and is releasably mounted in the computer rack for greater flexibility.

Heretofore the power supply-to-unit electrical connections have been made directly to the units themselves or to fixedly mounted plug-in connectors. The aforementioned mode of interconnection greatly reduced the "flexibility" of the computer, restricting the components to predetermined positions in the computer rack. Therefore, is is an object of this invention to improve the flexibility of computers and like devices using a common power supply by providing an improved electrical distribution apparatus.

A further object of the invention is to provide a readily assembled bus bar structure. Yet another object of the invention is to simplify power distribution within a computer assembly and further to provide a compact bus structure.

The above and other objects and advantages of the invention are achieved in the illustrative embodiments described in detail below. Briefly, an illustrative embodiment of the invention provides a bus assembly comprising a plurality of arrayed bus bars and an insulator member which receives and mutually spaces the bars. The insulator and the bars have mutually engaging portions for retaining the bars in position. The insulator has portions extending between the connector-receiving portions of adjacent bars to inhibit direct contact between the bars.

The illustrative embodiment will be best understood from the following description taken in conjunction with the accompanying drawings, forming part of this disclosure, in which.

Figure 1:
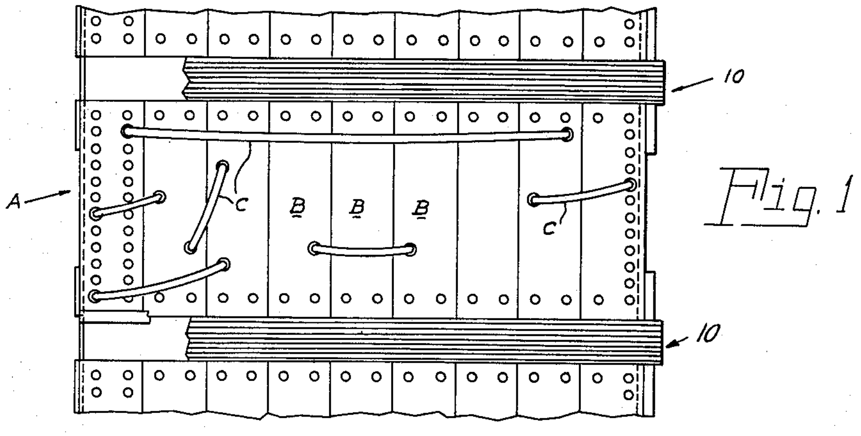
FIGURE 1 is a fragmentary rear elevation of a computer structure embodying an illustrative embodiment of the invention.
Figure 2:
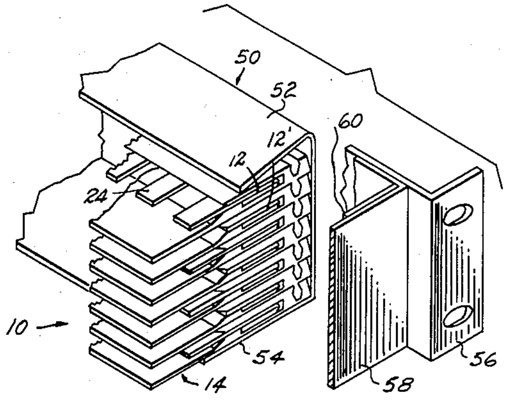
FIGURE 2 is a fragmentary projection of one embodiment of the invention.
Figures 5, 6:
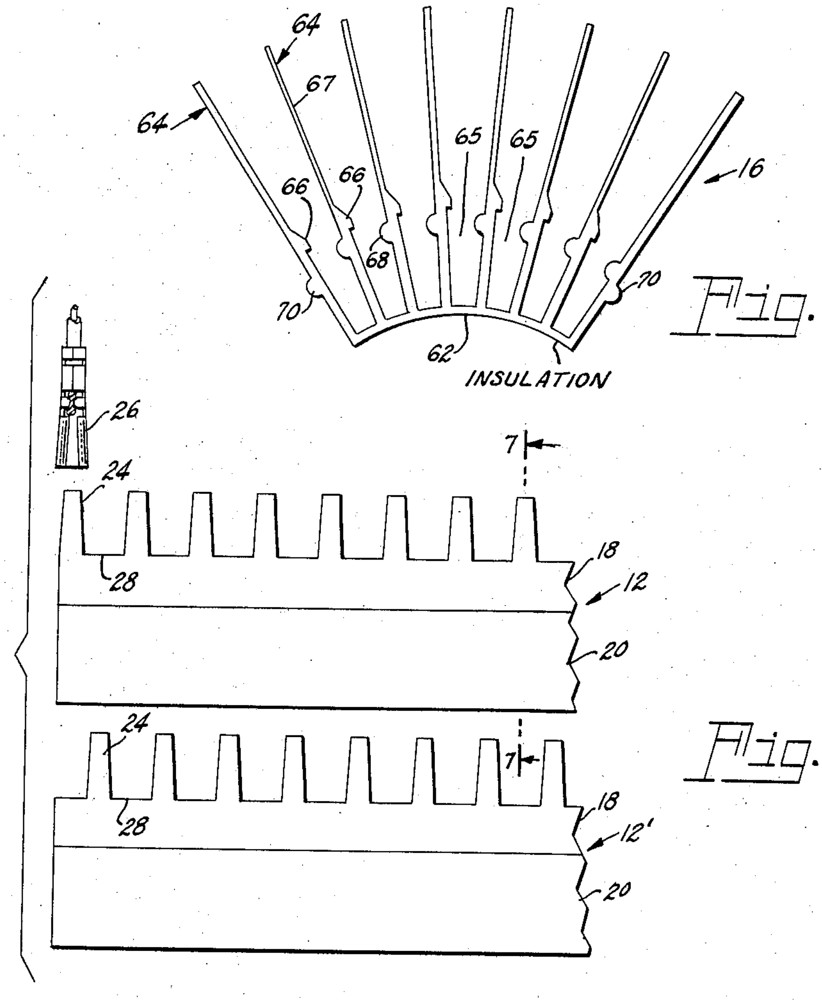
FIGURE 5 is an end view, of the insulator of the embodiment of FIGURE 3 shown flexed prior to the insertion of the bus bar conductors therein.
FIGURE 6 is a partial, exploded plan view of two of the bus bar conductors useable in either of the embodiments of FIGURES 2 and 3 showing their staggered relationship relative to one another and a typical connector element for use therewith.
Figure 7:
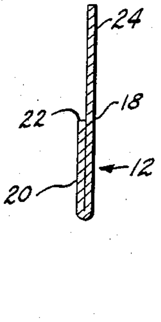
FIGURE 7 is an end view in section of one of the conductors of FIGURE 6 taken along the line 7—7 of FIGURE 6.

Referring to the drawings, the computer A includes a plurality of patching modules B interconnected by patch cords C. The modules B are connected to the power bus assembly 10. Bus assembly 10 includes a plurality of conductors or bus bars 12, 12′ fixedly supported by an insulator. In the embodiment of FIGURE 2 the insulator is composed of a plurality of inter-engaged individual members 14 while in the embodiment of FIGURE 3 the insulator member is a single unit 16. Referring now to FIGURES 6 and 7 the bus bars 12, 12′, which are substantially identical, are fabricated from high conductivity material such as copper, and plated with gold, silver or tin for reduced contact resistance. Each bar 12, 12′ has a body portion 18 of a given thickness and a base portion 20 of greater thickness. The base 20 may be formed by lancing up selected portions or areas of the body or, preferably, as in FIGURE 7, by folding over the stock from which the bar is formed. The bent-over end 22 of the stock extends somewhat more than one-half of the depth of the base 18 and, in the illustrative embodiment along the full length of the bar. A plurality of connector-receiving points are provided along each bar in form of dentiform projections 24. The projections or teeth 24 are equally spaced along the bars 12, 12′ and are formed in the body 18 of the bar as by notching out the intermediate portions. Teeth 24 are truncated and are adapted to mate with the standard plug-in female connectors 26. Bars 12 and 12′ are arranged alternately in their assembled configuration so that the first tooth 24 on bar 12 occurs at one end of the bar and the first tooth 24 in bar 12′ is centered on the mid-point of the adjacent notch 28 in the bar 12—and vice versa. In this manner, when a plurality of bars 12, 12′ are assembled in the insulator all the "odd" numbered or "even" numbered bars 12, 12′ have their teeth in alignment.

Figure 4:
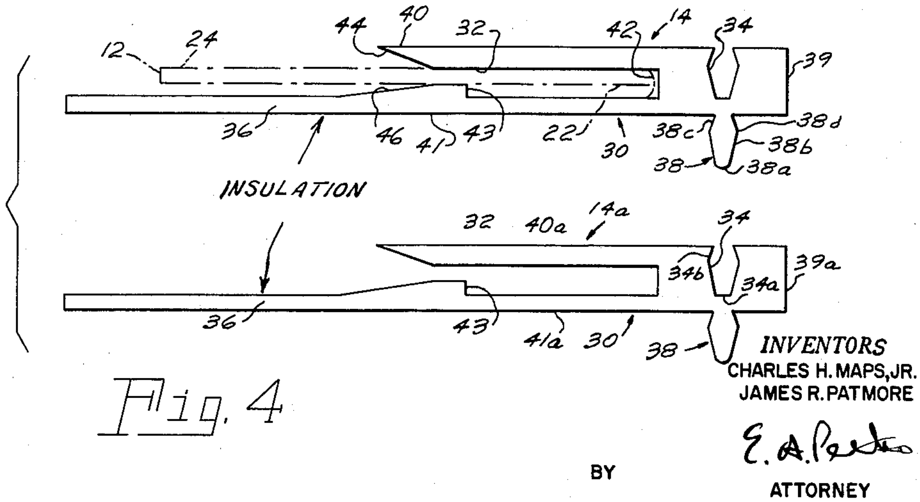
FIGURE 4 is a partial, exploded, end view, on a greatly enlarged scale, of a portion of the insulator structure of the embodiment of FIGURE 2.

In the embodiment of FIGURE 2 the insulator comprises an assembly of a plurality of individual sub-insulators 14. Each of the insulator members (see FIGURE 4) 14 is identical and only one will be described. Member 14 is fabricated from relatively resilient insulating material, such as polyvinyl chloride, and has a base portion indicated generally at 30. Two, mutually perpendicular, longitudinally-extending pockets or cavities 32, 34 are provided in base 30 for purposes presently to be described. The base is further provided with a continuous extension 36 and a projection 38 which extends the full length of the member 14. The projection 38 and cavity 34 are equidistant from the rear wall 39 of the member.

Base cavity 32, defined by walls 40 and 41, is adapted to receive and securely retain a bus bar which bottoms in the cavity against inner wall 42. The insulator 14 has an inwardly directed stop 43 which engages the portion 22 of the bar 12 and thereby inhibits removal of the bar once properly inserted. The resilience of the insulator permits the insertion of the bar. During the insertion operation the doubled-over portion of the bar 12 engages the bevelled edges 44, 46 of walls 40, 41 and deflects the walls sufficiently to allow the bar to pass inwardly beyond the stop 43. The body of bar 12 is approximately centered with respect to the thickness insulator so that clearance is provided about the projections 24. The aforementioned continuous extension 36 terminates at a point beyond the ends of the teeth 24 so that it serves to insulate adjacent connectors 26. The extension 36, being thinner than the body of the insulator 14, is readily deflectable to ease the coupling of a connector 26 and a respective one of the bus bar teeth 24.

The longitudinally extending projection 38 has a rounded end 38*a*, outwardly diverging sides 38*b* and re-entrant sides 38*c*. The widest portion of the projection is at the junction 38*d* of the diverging and re-entrant sides. Cavity 34 has a complementary configuration with a flat bottom 34*a* and re-entrant edges 34*b*. The resilience of the insulating material allows the members 14 to be "snapped" together to form the overall insulator block shown in FIGURE 2. Each projection 38 is received in the corresponding cavity 34 of an adjacent member 14*a* and is retained therein by the coaction of the re-entrant edges 34*b* of the cavity and the re-entrant sides 38*c* of the projection. The wall 41 of the insulator from which the projection 38 extends is then flush with wall 40*a* containing the cavity 34. The rear walls 39, 39*a*, etc., of the assembled members 14 lie in the same plane and the bars 12, 12′ are arrayed with their wide faces in substantially parallel planes. While so illustrated, the projection 38 need not bottom in the cavity so long as the adjacent walls are held together firmly. The members 14 extend slightly beyond the longitudinal ends of the bars for insulation purposes.

As many sub-assemblies of members 14 and bus bars 12, 12′ may be snapped together as are required. A typical assembly, as shown in FIGURE 2 has seven bars with an "energization" schedule as follows (1) +15 volts D.C.
(2) −15 volts D.C.
(3) ±low quality ground
(4) ±high quality ground (computer bus)
(5) +30 volts D.C.
(6) +6.3 volts D.C.
(7) "Spare"

It will be understood that the bars 12, 12′ are connected by conventional means to a power supply, not shown, having the desired characteristics.

The entire bus bar assembly 10 is mounted on the computer A through a U-shaped spring clip 50 which has inturned legs 52, 54 which bear against the outermost members 14. Clip legs 52 and 54 insure that the sub-assemblies remain snapped together when in use. The clip 50 is affixed, by conventional means, to an L-shaped mounting bracket 56 which carries an end closure 58. A layer 60 of insulation is interposed between closure 58 and the bus bar assembly 10.

Figure 3:
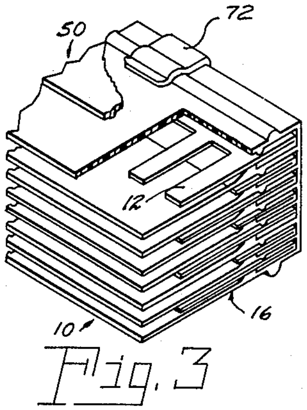
FIGURE 3 is a view similar to FIGURE 2 showing another embodiment of the invention.

The embodiment of the invention illustrated in FIGURES 3 and 5, employs a unitary insulator member 16 that comprises a web 62 and a pulrality of parallel walls 64 extending perpendicular therefrom. The member 16 is made of resilient insulating material such as polyvinyl chloride and may be formed by extrusion in either the form shown in FIGURE 3 or the form shown in FIGURE 5, viz, in either a flexed or unflexed form. The extrusion is then cut to the length desired. The walls 64 form a plurality of bar receiving pockets or cavities 65. Each of the walls 64 has an inwardly directed stop 66 which engages the thicker portion 22 of a bar. Projections 68 are formed on the walls of cavity 65 opposite the stops 66 and engage the base 18 of the bar. In assembling the embodiment of FIGURE 3 the web 62 is flexed as in FIGURE 5 and the bars 12, 12′ are interleaved between the walls 64 in the "odd" and "even" sequence previously described in connection with the embodiment of FIGURE 2. The walls 64 have a thinner, more flexible portion 67 that extends beyond the bars 12, 12′, as shown in FIGURE 3, similar to the extension 36 previously described. The bars bottom in the cavities 65 between the walls 64. When the web 62 is released they are securely retained in position by the stops 66 and projections 68. To further insure retention the outer walls of the insulator 16 are provided with protrusions 70 which are engaged by spring clips 72 (FIGURE 3). If the unitary insulator member 16 is made initially in a flexed form, such as shown in FIGURE 5, the spring clips 72 serve as the principal means for holding the member 16 in the form of FIGURE 3. The entire bus assembly may then be mounted on the computer A in a manner similar to that described in connection with the embodiment of FIGURE 2.

It should be noted that both embodiments lend themselves to a wide variation in the number of bars employed. In the case of the embodiment of FIGURES 3 and 5 an extrusion (insulator 16) having the appropriate number of cavities 65 may be used or the unneeded cavities may be filled with "dummy" bars having no connection points. In both embodiments replacement of the individual bars, when desired, is relatively simple.

It will be understood by those skilled in the art that various changes and modifications may be made herein without departing from the spirit of the invention.

What is claimed is:

1. A bus assembly comprising
a plurality of arrayed bus bars and an insulator member adapted to receive and mutually space said bars,
each of said bars having a base portion and a laterally extending connector-receiving portion, each of said base portions having a folded-over portion, thereby providing an edge which forms an abutment which engages a corresponding abutment of said insulator member for retaining said bars in position in said insulator member with said connector-receiving portions extending freely therefrom,
said insulator member having insulating extensions extending between the connector-receiving portions of adjacent bus bars to inhibit direct contact therebetween, and
said bus bar connector-receiving portions being dentiform.

2. The bus assembly of claim 1 in which said adjacent bus bars are arrayed in an offset staggered relationship with one another so that the dentiform portions of adjacent bars are not in alignment with one another.

3. The bus assembly of claim 1 in which said insulator member is formed of a plurality of discrete sub-insulators, and said sub-insulators having complementary configurations providing retentive engagement between adjacent ones of said insulators.

4. The bus assembly of claim 1 in which each of said bus bars has a broad face and a narrow face, and said insulator member being of one-piece construction having a web transverse the parallel planes of said broad faces of said bars.

References Cited by the Examiner

UNITED STATES PATENTS

| | | | |
|---|---|---|---|
| 1,955,531 | 4/1934 | Christopher | 339—21 |
| 2,240,180 | 4/1941 | Frank | 339—21 |
| 2,465,540 | 3/1949 | Korn | 339—198 |
| 2,609,414 | 9/1952 | Weisberg | 339—157 |
| 2,965,872 | 12/1960 | Linn | 339—198 X |

FOREIGN PATENTS

| | | |
|---|---|---|
| 628,786 | 10/1961 | Great Britain. |
| 767,333 | 1/1957 | Great Britain. |

JOSEPH D. SEERS, *Primary Examiner.*

PATRICK A. CLIFFORD, *Examiner.*